(12) United States Patent
Anderson et al.

(10) Patent No.: US 6,505,567 B1
(45) Date of Patent: Jan. 14, 2003

(54) OXYGEN FIRED CIRCULATING FLUIDIZED BED STEAM GENERATOR

(75) Inventors: David K. Anderson, E. Longmeadow, MA (US); Greg N. Liljedahl, Tariffville, CT (US); John L. Marion, W. Simsbury, CT (US)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/994,121

(22) Filed: Nov. 26, 2001

(51) Int. Cl.[7] ................................................. F23J 11/00
(52) U.S. Cl. ........................ 110/344; 110/345; 110/243
(58) Field of Search ................................. 110/341, 344, 110/345, 347, 243, 244, 245; 60/39.464; 422/146, 147; 502/42; 48/202, 197 R; 431/2

(56) References Cited

U.S. PATENT DOCUMENTS

| | | | | |
|---|---|---|---|---|
| 3,876,392 A | * | 4/1975 | Kalina et al. .................. | 48/210 |
| 4,244,779 A | * | 1/1981 | Nieminen et al. ......... | 162/30 R |
| 4,426,810 A | * | 1/1984 | Rudolph et al. ........... | 48/197 R |
| 4,498,289 A | * | 2/1985 | Osgerby ..................... | 60/39.52 |
| 4,597,771 A | * | 7/1986 | Cheng ............................ | 48/77 |
| 4,731,099 A | * | 3/1988 | Ergezinger ................ | 48/197 R |
| 4,745,884 A | * | 5/1988 | Coulthard ................... | 122/4 D |
| 5,175,995 A | * | 1/1993 | Pak .......................... | 60/39.182 |
| 5,335,609 A | * | 8/1994 | Nelson et al. ............... | 110/346 |
| 5,339,774 A | * | 8/1994 | Tang .......................... | 122/4 D |
| 5,908,804 A | * | 6/1999 | Menon et al. ................. | 502/38 |
| 6,202,574 B1 | * | 3/2001 | Liljedahl et al. ............ | 110/233 |

* cited by examiner

Primary Examiner—Ira S. Lazarus
Assistant Examiner—K. B. Rinehart
(74) Attorney, Agent, or Firm—Russell W. Warnock

(57) ABSTRACT

A circulating fluidized bed steam generator 10 and a method for operating the circulating fluidized bed steam generator are provided which offer the flexibility to use carbon dioxide ($CO_2$) both as a desirable end product and as support to the combustion process. The method includes the step of introducing a substantially pure oxygen feed stream into the circulating fluidized bed steam generator 10 and the step of combusting a fuel in the presence of the substantially pure oxygen feed stream to produce a flue gas having carbon dioxide and water vapor as its two largest constituent elements by volume. The method also includes the step of passing the flue gas through an oxygen feed stream preheater 144 at which heat from the flue gas is transferred to the oxygen feed stream. Furthermore, the method includes the step of separating the flue gas into an end product portion and a recycling portion. The method additionally includes cooling and compressing the end product portion of the flue gas so as to yield carbon dioxide in a liquid phase and directing the recycling portion of the flue gas to the circulating fluidized bed steam generator 10 to contribute to the combustion process therein.

5 Claims, 2 Drawing Sheets

OXYGEN FIRED CIRCULATING FLUIDIZED BED STEAM GENERATOR

BACKGROUND OF THE INVENTION

The present invention relates to a circulating fluidized bed steam generator and a method for operating the circulating fluidized bed steam generator for producing a carbon dioxide end product.

U.S. Pat. No. 5,175,995 to Pak et al describes a conventional power generation plant operable to burn fuel with air in a combustor so as to thereby provide combustion gas energy to drive a steam or gas turbine. In those versions of such conventional power generation plants which combust natural gas, petroleum fuel gas or coal gas as the fuel for the combustion process, this fuel includes carbon components such as carbon (C), carbon monoxide (CO), and other hydrocarbons ($C_m H_n$). Accordingly, the flue gas produced by a combustion process which combusts the fuel in the presence of air is comprised of carbon dioxide ($CO_2$), nitrogen oxide ($NO_x$), and sulfur oxide ($SO_x$) as well as nitrogen gas ($N_2$).

The '995 Pak et al patent further notes that the release of gases such as $NO_x$, $SO_x$, and $CO_2$ into the atmosphere creates environmental pollution. Conventional power generation plants have conventionally countered such pollution by the deployment of removal equipment such as scrubbers to remove the $NO_x$ and $SO_x$ pollutants. Moreover, removal equipment has been deployed to remove the carbon dioxide ($CO_2$) present in the flue gas including removal equipment of the type which utilizes a sorbent to selectively absorb the carbon dioxide ($CO_2$) from the flue gas. However, this solvent approach, according to the '995 Pak et al patent, disadvantageously requires additional heat energy to heat the solvent and it is not practical to provide the relatively long contact time between the solvent and the carbon dioxide ($CO_2$) for the solvent to fully absorb the carbon dioxide ($CO_2$).

The '995 Pak et al patent discloses several versions of a closed combined cycle type power generation plant which purports to ameliorate some of the disadvantages of the carbon dioxide ($CO_2$) absorbing solvent approach. In each version of the power generation plant disclosed in this reference, fuel is supplied to a combustor in the presence of oxygen instead of in the presence of air so as to produce a combustion gas (flue gas) which mainly includes a water component and carbon dioxide ($CO_2$). This combustion gas is handled so as to separate the water component and the carbon dioxide ($CO_2$) with the separated carbon dioxide ($CO_2$) being recycled as the working fluid for driving a turbine of the combined cycle power generation plant. Since the combustion of the fuel in presence of oxygen instead of air substantially eliminates the creation of $NO_x$ and, further, since the carbon dioxide ($CO_2$) is retained within the closed cycle as a working fluid, the approach disclosed by the '995 Pak et al patent advantageously avoids the discharge of $NO_x$ as well as carbon dioxide ($CO_2$).

U.S. Pat. No. 4,498,289 to Osgersby also discloses a power system which combusts a hydrocarbonic fuel in the presence of oxygen in lieu of air so as to obtain a working fluid comprised of carbon dioxide ($CO_2$). While the '995 Pak et al patent and the '289 Osgersby patent each disclose an arrangement for reducing carbon dioxide ($CO_2$) emissions via the combustion of fuel in the presence of oxygen instead of air, the art could still benefit from an arrangement for new or existing power generation system designs which offers the flexibility to both to produce carbon dioxide ($CO_2$) as a desirable end product and to use carbon dioxide ($CO_2$) as support to the combustion process. Also, the art could benefit from an arrangement comprising a circulating fluidized bed steam generator whose combustion temperature can be controlled with the aid of up to no more than one-half the typical requirement for flue gas recirculation required by a comparably performing pulverized coal steam generator.

SUMMARY OF THE INVENTION

It is an object of the present invention to provide an arrangement for new or existing power generation system designs which offers the flexibility both to produce carbon dioxide ($CO_2$) as a desirable end product and as support to the combustion process.

It is another object of the present invention to provide an arrangement for producing liquid carbon dioxide ($CO_2$) which improves the heat output of a fossil fuel fired power generating system.

According to one aspect of the present invention, a method for operating a circulating fluidized bed steam generator is provided for new or existing power generation system designs which offers the flexibility to use carbon dioxide ($CO_2$) both as a desirable end product and as support to the combustion process. The method includes the step of introducing a substantially pure oxygen feed stream into the circulating fluidized bed steam generator and the step of combusting a fuel in the presence of the substantially pure oxygen feed stream to produce a flue gas having carbon dioxide and water vapor as its two largest constituent elements by volume.

The method for operating a circulating fluidized bed steam generator in accordance with the present invention includes the steps of introducing a substantially pure oxygen feed stream into the circulating fluidized bed steam generator, combusting a fuel in the presence of the substantially pure oxygen feed stream to produce a flue gas having carbon dioxide and water vapor as its two largest constituent elements by volume, passing the flue gas through an oxygen feed stream pre-heater at which heat from the flue gas is transferred to the oxygen feed stream, separating the flue gas into an end product portion and a recycling portion, and directing the recycling portion of the flue gas to the circulating fluidized bed steam generator to contribute to the combustion process therein. Preferably, the method also includes cooling and compressing the end product portion of the flue gas so as to yield carbon dioxide in a liquid phase.

According to another aspect of the present invention, there is provided a circulating fluidized bed steam generator which includes means for introducing a substantially pure oxygen feed stream into the circulating fluidized bed steam generator, means for combusting a fuel in the presence of the substantially pure oxygen feed stream to produce a flue gas having carbon dioxide and water vapor as its two largest constituent elements by volume, means for passing the flue gas through an oxygen feed stream pre-heater at which heat from the flue gas is transferred to the oxygen feed stream, means for separating the flue gas into an end product portion and a recycling portion, and means for directing the recycling portion of the flue gas to the circulating fluidized bed steam generator to contribute to the combustion process therein. Preferably, the circulating fluidized bed steam generator also includes means for cooling and compressing the end product portion of the flue gas so as to yield carbon dioxide in a liquid phase.

DETAILED DESCRIPTION OF THE PREFERRED EMBODIMENT

Figure 1:
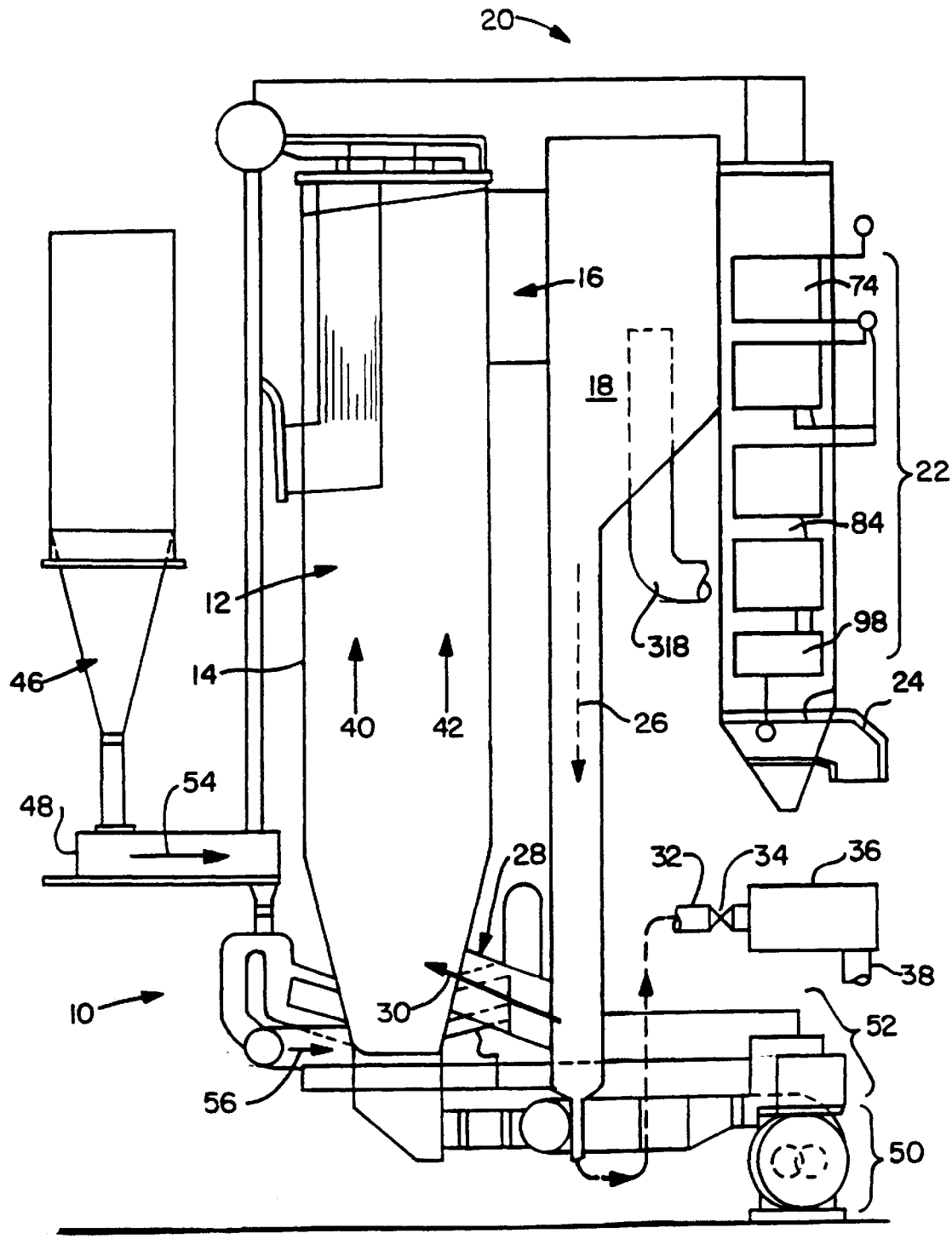
FIG. 1 is a schematic view of a circulating fluidized bed steam generator.
Figure 2:
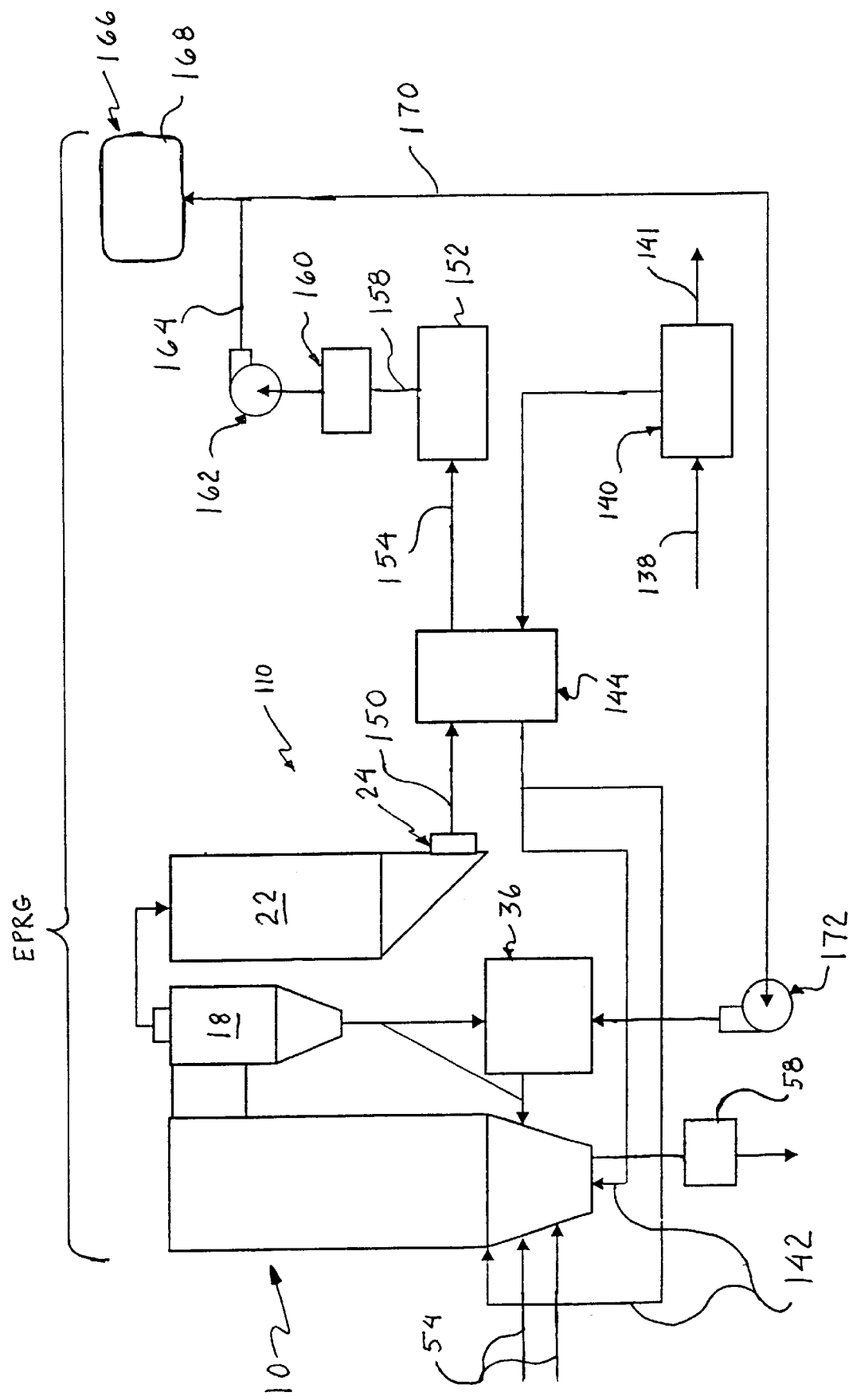
FIG. 2 is a schematic view of a combined cycle power generating unit comprising the circulating fluidized bed steam generator shown in FIG. 1 for producing a carbon dioxide end product.

Referring initially to FIG. 2 of the drawings, there is depicted therein an embodiment of the oxygen fired circulating fluidized bed steam generator (CFB) of the present invention. The circulating fluidized bed steam generator (CFB), generally designated by the reference numeral 10, uses oxygen in lieu of air for combustion to thereby advantageously minimize the amount of recirculated flue gas in a cost favorable manner. However, before providing a detailed description of the entirety of the circulating fluidized bed steam generator 10 and, thereafter, a detailed description of a combined cycle power generating unit comprising the circulating fluidized bed steam generator 10, reference will first be had to FIG. 1 of the drawings to provide a general description of a sub group of combustion and hot solids-gas separator components of the circulating fluidized bed steam generator 10.

It is to be understood that the configuration of the circulating fluidized bed steam generator 10, including the presence or absence, the placement, and the interconnection of its assorted elements, as illustrated and described herein, is to be understood as merely exemplary of one configuration in which an oxygen fired circulating fluidized bed system in accordance with the present invention may be employed. For this reason, it is noted that the following discussion of the circulating fluidized bed steam generator 10 discloses merely one possible operational arrangement and it is contemplated that, as desired or as dictated by circumstances, the configuration of the circulating fluidized bed steam generator 10, including the presence or absence, the placement, and the interconnection of its assorted elements, may be changed while nonetheless representing an embodiment of the circulating fluidized bed system of the present invention.

As illustrated in FIG. 1, the circulating fluidized bed steam generator 10 includes a furnace volume, denoted therein by the reference numeral 12, the latter being defined by waterwall tubes, denoted therein by the reference numeral 14; a first section of ductwork, denoted therein by the reference numeral 16; a combined hot solids-gas separator, denoted therein by the reference numeral 18; an intermediate section of backpass ductwork, denoted therein by the reference numeral 20; and a backpass volume, denoted therein by the reference numeral 22, from which further ductwork, denoted therein by the reference numeral 24, extends.

The furnace volume 12 is water cooled via water transported through the waterwall tubes 14 whereas the combined hot solids-gas separator 18 and the backpass volume are steam cooled via tubes integrated into their wall structures.

The lower segment of the combined hot solids-gas separator 18, which can be, for example, a conventional cyclone, is connected in fluid flow relation with the lower segment of the furnace volume 12 through a fluid flow system consisting, in accordance with the illustration thereof in FIG. 1 of an initial collection path, denoted therein by the reference numeral 26; a direct return measured feed device, denoted therein by the reference numeral 28; a direct return path, denoted therein by the reference numeral 30; a fluidized bed heat exchanger (FBHE) inlet, denoted therein by the reference numeral 32; an ash control valve, denoted therein by the reference numeral 34; a fluidized bed heat exchanger (FBHE), denoted therein by the reference numeral 36; and a fluidized bed heat exchanger (FBHE) outlet, denoted therein by the reference numeral 38. For purposes of the discussion that follows hereinafter, the ductwork 16, the combined hot solids-gas separator 18 and the fluid flow system 26, 28, 30, 32, 34, 36, 38 will be referred to as a hot solids circulation path, denoted by the reference numerals 40, 42, 44. Further, it is to be understood that the fluid flow system 26, 28, 30, 32, 34, 36, 38 is typical of the fluid flow system, which is cooperatively associated with the combined hot solids-gas separator 18. It can be seen from a reference to FIG. 1 of the drawing that the furnace volume 12 is in communication with a source, denoted therein by the reference numeral 46, of fuel and sorbent through a supply line, denoted therein by the reference numeral 48, as well as with a source, denoted therein by the reference numeral 50, of oxygen through a supply line, denoted therein by the reference numeral 52.

With regard to FIG. 1 of the drawing, it will be understood from reference thereto that in the lower segment of the furnace volume 12 a mixture of fuel and sorbent, denoted therein by the reference numeral 54, is mixed for purposes of the combustion thereof with oxygen, denoted therein by the reference numeral 56. Preferably, fluidizing media comprising the oxygen 56 is fed through a floor grate on which the fluidized bed of the furnace volume 12 is disposed and additional oxygen is fed at two levels above the floor grate. Moreover, it is preferred to configure the feed and sorbent supply line 48 to include air-assisted fuel and sorbent feed nozzles to thereby advantageously minimize waterwall penetration opening size and to minimize fuel chute plugging potential. Ash can be drained from the lower volume 12 of the circulating fluidized bed steam generator 10 via a conventional ash cooler 58, shown in FIG. 2.

In known fashion, from this combustion, hot combustion gases, denoted therein by the reference numeral 40, are produced and hot solids, denoted therein by the reference numeral 42, are entrained in the hot combustion gases 40. These hot combustion gases 40 with the hot solids 42 entrained therewith rise within the furnace volume 12 whereupon at the top of the furnace volume 12 the hot combustion gases 40 with the hot solids 42 entrained therewith are made to flow through the duct 16 to the combined hot solids-gas separator 18.

Within the combined hot solids-gas separator 18, the hot solids 42 that are made to flow thereto, which are above a predetermined size, are separated from the hot combustion gases 40 in which they are entrained. The separated hot solids 42 which contain unburned fuel, flyash and sorbent, as well as carbon dioxide ($CO_2$) and water vapor ($H_2O$), flow through the combined hot solids-gas separator 18. From the combined hot solids-gas separator 18, the hot solids 42 are discharged under the influence of gravity into the initial collection path 26, from whence a portion of the hot solids 42 flow through the initial collection path 26 to and through the direct return measured feed device 28. Thereafter, from the direct return measured feed device 28, this portion of the hot solids 42 is reintroduced by means of a corresponding direct return path 30 into the lower segment of the furnace volume 12 whereupon this portion of the hot solids 42 are once again subjected to the combustion process that takes place in the circulating fluidized bed steam generator (CFB) 10. The remainder of the hot solids 42 which are above a predetermined size, denoted as heat exchanger hot solids 44, are diverted from the combined hot solids-gas separator 18 to the fluidized bed heat exchanger (FBHE) 36 by way of the heat exchanger inlet 32 and thence to the lower segment of the furnace volume 12 via a corresponding heat exchanger outlet 38. The hot solids 42 diverted through the fluidized bed heat exchanger (FBHE) 36 are cooled in a heat exchange process in which the hot solids transfer heat to a working fluid which flows through the fluidized bed heat exchanger (FBHE) 36 in conventional manner. The temperature in the circulating fluidized bed steam generator (CFB) 10 can thus be controlled by properly splitting the flow of hot recirculated solids 42 leaving the cyclone such that an uncooled stream of solids flows directly back to the circulating fluidized bed steam generator (CFB) 10 or is therebefore cooled by the fluidized bed heat exchanger (FBHE) 36 before flowing to the circulating fluidized bed steam generator (CFB) 10.

Continuing, on the other hand, the hot combustion gases 40 leaving the combined hot solids-gas separator 18, hereinafter referred to as flue gases, are directed from the combined hot solids-gas separator 18 via the intermediate backpass ductwork 20 to the backpass volume 22, where additional heat transfer duty is performed therewith as will be described more fully hereinafter. From the backpass volume 22, the flue gases 40 exit through the ductwork 24 to a sub group of downstream flue gas treatment components which will be described in more detail hereinafter with reference to FIG. 2.

FIG. 2 is a schematic view of an exemplary combined cycle power generating unit 110 comprising the circulating fluidized bed steam generator 10 which is operable to both generate electrical power and produce a carbon dioxide ($CO_2$) end product as well as, optionally, a nitrogen ($N_2$) product. Details of the arrangement—hereinafter generally designated as the end product and recyclable group EPRG—will now be provided commencing with a description of the details concerning the combined cycle power generating unit 110. Attention is now drawn to FIG. 2 which illustrates the exemplary combined cycle power generating unit 110 having a fuel fired combustion vessel in the form of the circulating fluidized bed steam generator 10 and additionally including the sub group of the downstream flue gas treatment components and a sub group of oxygen supplying components, these latter two sub groups being hereinafter referred to as the end product and recyclable group EPRG. One of the oxygen supplying components treats a stream of air 112 to render oxygen therefrom of a desired purity.

The combined cycle power generating unit 110 also includes a turbine 136 for generating electricity under the motive action of steam passed thereover. Steam is conducted from the circulating fluidized bed steam generator 10 to the turbine 136 via a plurality of ducts 138 and injected thereagainst to drive the turbine.

With reference again to FIG. 2, the end product and recyclable group EPRG also includes an oxygen source 140 for supplying the particular variety of combustion gas via appropriate means such as, for example, via oxygen introducing elements 142. The oxygen introducing elements 142 comprise the supply line 50, and the supply line which supplies the additional two upper levels of oxygen, which respectively introduce oxygen into the lower volume of the circulating fluidized bed steam generator 10 and into at least one location above the mixture of fuel and sorbent 54. The oxygen ($O_2$) supplied into the circulating fluidized bed steam generator 10 reacts with the fuel being fed into the circulating fluidized bed steam generator 10, such fuel preferably being a fossil fuel with a high carbon content such as, for example, coal or petcoke, or biomass.

The oxygen ($O_2$) supplied by the oxygen source 140 is preferably created by an air separation process performed by an air separation unit which separates oxygen ($O_2$) from an ambient air feed stream and, in this regard, the oxygen source 140 can be configured, for example, as a cryogenic plant having the capability of producing oxygen ($O_2$) of a purity of at least ninety-five percent (95%). The air separation unit can be configured, if desired, to produce as well a nitrogen ($N_2$) product 141. The oxygen source 140 can alternatively be configured as an apparatus comprising an oxygen transport membrane.

The oxygen ($O_2$) supplied by the oxygen source 140 is pre heated upstream of the oxygen introducing elements 142 by a pure oxygen pre heater 144 having a cold side inlet communicated with an exit duct 146 of the oxygen source 140 and a cold side outlet communicated with a duct 148 which, in turn, is connected via a duct manifold arrangement with the oxygen introducing elements 142. The hot side of the pure oxygen pre heater 144 is supplied with flue gas which has exited the back pass volume 22 via the ductwork 24.

The flue gas which had been supplied from the back pass volume flows through a duct 150 communicated with the hot side inlet of the pure oxygen pre heater 144. The flue gas then gives up further heat to the oxygen ($O_2$) flowing through the pure oxygen pre heater 144 enroute to the circulating fluidized bed steam generator 10.

The two largest constituent elements by volume of the flue gas exiting the back pass 22 are carbon dioxide ($CO_2$) and water vapor ($H_2O$). This composition of the flue gas results from the combustion of the coal within the circulating fluidized bed steam generator 10 in the presence of the pure or nearly pure oxygen supplied from the oxygen source 140 and in the presence of recycled solids which are fed to the circulating fluidized bed steam generator 10 by the fluidized bed heat exchanger (FBHE) 36.

The end product and recyclable group EPRG additionally includes, as seen in FIG. 1, a particulate removal system for removing relatively fine particulate matter in the form of an electrostatic precipitator 152 operable to remove, in conventional manner, selected solids entrained with the flue gas. The electrostatic precipitator 152 is communicated with the pure oxygen pre heater 144 via a duct 154 for receiving the flue gas following its passage through the pure oxygen pre heater 144. The flue gas exiting the electrostatic precipitator 152 next flows via a duct 156 to a gas cooler 160 whereat some of the water vapor ($H_2O$) is condensed out before the flue gas is further flowed downstream to an induced draft fan 162. The gas cooler 160 cools the flue gas to the lowest temperature possible before recycling to minimize fluidizing air blower power requirements. The gas cooler 160 contacts the flue gas with relatively colder water in countercurrent fashion and this contact causes a relatively significant proportion of the water vapor in the flue gas to condense into water and the water is then separated from the flue gas.

The flue gas exiting the induced draft fan 162 in a stream 164, which is mainly comprised of carbon dioxide ($CO_2$), is split or segregated such that the majority of the flue gas is guided to a location 166 at which the flue gas can be further processed, used, or sequestered. For example, the end product and recyclable group EPRG may include a liquid recovery assembly 168 which is operable to liquefy a portion of the carbon dioxide ($CO_2$) of the flue gas so as to render a liquid carbon dioxide product suitable for a commercial operation such as, for example, enhanced oil recovery (EOR). Additionally, the nitrogen ($N_2$) product 141 produced by the oxygen source 140 (if it is so configured to produce this product) can be used for enhanced oil recovery (EOR) as well.

A relatively small portion of the flue gas which is diverted to the location 166 is ultimately recycled into the circulating fluidized bed steam generator 10 in a recycle stream 170. Typically, this portion of the flue gas is only a small fraction of the total flue gas flowed through the gas cooler 160 and the requirement for this flue gas portion is selected as a function of the amount required for fluidization purposes in the circulating fluidized bed steam generator 10. Such fluidization is performed at least in part by a fluidizing air blower 172 which directs this flue gas portion to the fluidized bed heat exchanger (FBHE) 36.

The end product and recyclable group EPRG thus provides a system which can be operated in accordance with the method of the present invention to produce a liquid carbon dioxide ($CO_2$) end product and a recyclable flue gas for supporting the combustion process. Additionally, the recirculation of solids is employed in accordance with the method of the present invention to control the combustion temperatures in the circulating fluidized bed steam generator. Moreover, there is a relative reduction in the creation of nitrogen as compared to a conventional circulating fluidized bed steam generator without oxygen firing. Due to the use of oxygen instead of air and the minimization of recirculated flue gas, relatively more compact designs of the circulating fluidized bed steam generator, the gas-hot solids separator, and the back pass heat exchanger can be realized in accordance with the present invention.

While an embodiment and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

We claim:

1. A method for operating a circulating fluidized bed steam generator, comprising:

introducing a substantially pure oxygen feed stream into the circulating fluidized bed steam generator combusting a fuel in the presence of the substantially pure oxygen feed stream to produce a flue gas having carbon dioxide and water vapor as its two largest constituent elements by volume;

passing the flue gas through an oxygen feed stream pre-heater at which heat from the flue gas is transferred to the oxygen feed stream;

separating the flue gas into an end product portion and a recycling portion; and directing the recycling portion of the flue gas to the circulating fluidized bed steam generator to contribute to the combustion process therein.

2. A method according to claim 1 and further including cooling and compressing the end product portion of the flue gas so as to yield carbon dioxide in a liquid phase.

3. A method according to claim 2 wherein the step of directing a recycling portion of the flue gas to the circulating fluidized bed steam generator includes diverting at least part of the recycling portion of the flue gas through a solids heat exchanger to effect a transfer of heat from the recycling portion of the flue gas to the solids being flowed through the solids heat exchanger.

4. A circulating fluidized bed steam generator, comprising:

means for introducing a substantially pure oxygen feed stream into the circulating fluidized bed steam generator;

means for combusting a fuel in the presence of the substantially pure oxygen feed stream to produce a flue gas having carbon dioxide and water vapor as its two largest constituent elements by volume;

means for passing the flue gas through an oxygen feed stream pre-heater at which heat from the flue gas is transferred to the oxygen feed stream;

means for separating the flue gas into an end product portion and a recycling portion; and means for directing the recycling portion of the flue gas to the circulating fluidized bed steam generator to contribute to the combustion process therein.

5. A circulating fluidized bed steam generator according to claim 4 and further including means for cooling and compressing the end product portion of the flue gas so as to yield carbon dioxide in a liquid phase.

* * * * *